US012662971B2

(12) United States Patent
Neaville et al.

(10) Patent No.: US 12,662,971 B2
(45) Date of Patent: Jun. 23, 2026

(54) SYSTEMS AND METHODS FOR VENTING A PRESSURIZED FLUID USED AS A FUEL IN AN ENGINE

(71) Applicant: Caterpillar Inc., Peoria, IL (US)

(72) Inventors: Andrew Jordon Neaville, Mt. Pulaski, IL (US); Jeffrey Michael Thate, Washington, IL (US); Zachary Scott Engstrom, East Peoria, IL (US); Michael T. Graziano, Jr., Washington, IL (US); Ryan Michael Snodgrass, Fowler, IN (US)

(73) Assignee: Caterpillar Inc., Peoria, IL (US)

( * ) Notice: Subject to any disclaimer, the term of this patent is extended or adjusted under 35 U.S.C. 154(b) by 126 days.

(21) Appl. No.: 18/638,227

(22) Filed: Apr. 17, 2024

(65) Prior Publication Data

US 2025/0327427 A1 Oct. 23, 2025

(51) Int. Cl.

| | |
|---|---|
| ***F02D 19/02*** | (2006.01) |
| ***F02D 19/06*** | (2006.01) |
| ***F02D 41/00*** | (2006.01) |
| ***F02D 41/04*** | (2006.01) |
| ***F02D 41/22*** | (2006.01) |
| ***F02M 21/02*** | (2006.01) |

(52) U.S. Cl.

CPC ....... *F02D 19/022* (2013.01); *F02D 19/0642* (2013.01); *F02D 41/0027* (2013.01); *F02D 41/042* (2013.01); *F02D 41/22* (2013.01); *F02M 21/0206* (2013.01); *F02M 21/0209* (2013.01); *F02M 21/0215* (2013.01); *F02M 21/0218* (2013.01); *F02M 21/0239* (2013.01); *F02M 21/0242* (2013.01); *F02M 21/0293* (2013.01); *F02D 2041/224* (2013.01)

(58) Field of Classification Search

CPC ............... F02D 19/022; F02D 19/0621; F02D 41/0025; F02D 41/0027; F02D 41/22; F02D 2041/224; F02M 21/0206; F02M 21/0209; F02M 21/0212; F02M 21/0215; F02M 21/0239; F02M 21/0242; F02M 21/0293

See application file for complete search history.

(56) References Cited

U.S. PATENT DOCUMENTS

| | | | |
|---|---|---|---|
| 6,327,898 | B1 | 12/2001 | Harris |
| 9,845,743 | B2 | 12/2017 | Holst |
| 10,371,102 | B2 | 8/2019 | Dudar |
| 10,934,948 | B2 | 3/2021 | Engfehr |

(Continued)

FOREIGN PATENT DOCUMENTS

| | | | | |
|---|---|---|---|---|
| DE | 102015214563 B3 | | 12/2016 | |
| EP | 2740918 A1 | * | 6/2014 | ......... F02D 19/0642 |

(Continued)

*Primary Examiner* — John M Zaleskas

(57) ABSTRACT

A system and method for venting gaseous fuel from an engine of an engine system are described. The engine system includes multiple vent valves that allow a controller of the engine system to vent different volumes of a fuel feed line that deliver the fuel to the engine. An engine purge controller controls the closing of isolation valves and the opening of vent valves to reduce a probability of fuel remaining in an isolation portion of the fuel feed line. The engine purge controller further controls the introduce of a purge gas to purge portions of the fuel from the fuel feed line through one or more of the vent valves.

16 Claims, 4 Drawing Sheets

(56) References Cited

U.S. PATENT DOCUMENTS

| | | | | |
|---|---|---|---|---|
| 11,779,900 | B2 | 10/2023 | Ruettinger | |
| 11,898,524 | B1 * | 2/2024 | Gerstner | F02M 37/54 |
| 2002/0083932 | A1 * | 7/2002 | Ishikawa | F02M 21/0233 123/527 |
| 2008/0135005 | A1 * | 6/2008 | Kotwicki | F02M 21/0293 123/1 A |
| 2011/0180042 | A1 * | 7/2011 | Johnson | F02D 41/0027 123/478 |
| 2015/0241306 | A1 * | 8/2015 | Sixel | F02D 35/023 73/114.02 |
| 2015/0252737 | A1 * | 9/2015 | Sixel | F02D 19/025 123/478 |
| 2015/0252741 | A1 * | 9/2015 | Sixel | F02D 19/0628 123/472 |
| 2015/0361943 | A1 * | 12/2015 | Sixel | F02D 35/023 123/406.45 |
| 2015/0377159 | A1 * | 12/2015 | Fisher | F02D 41/0025 123/525 |
| 2016/0003176 | A1 * | 1/2016 | Marscheider | F02D 41/0027 123/445 |
| 2016/0010581 | A1 * | 1/2016 | Sixel | F02D 41/3005 123/445 |
| 2016/0084179 | A1 * | 3/2016 | Holst | F02D 41/1475 123/434 |
| 2016/0290249 | A1 * | 10/2016 | Onishi | F02D 41/22 |
| 2016/0319765 | A1 * | 11/2016 | Neaville | F02D 19/023 |
| 2016/0348613 | A1 * | 12/2016 | Tuexen | F02M 21/023 |
| 2017/0350330 | A1 * | 12/2017 | Fisher | F02D 41/22 |
| 2018/0223773 | A1 * | 8/2018 | Boog | F02M 21/0293 |
| 2019/0242307 | A1 * | 8/2019 | Engfehr | F02D 19/0628 |
| 2021/0003085 | A1 * | 1/2021 | Fisher | F02D 41/22 |
| 2021/0310430 | A1 * | 10/2021 | Fisher | F02D 41/22 |
| 2021/0396187 | A1 * | 12/2021 | Dirumdam | G01M 3/283 |
| 2023/0068586 | A1 * | 3/2023 | Matsukawa | F02M 21/0221 |
| 2023/0123561 | A1 * | 4/2023 | Fisher | F02D 41/0027 123/525 |
| 2023/0193840 | A1 * | 6/2023 | Dillen | F02M 21/0293 123/439 |
| 2024/0234769 | A1 * | 7/2024 | Hidaka | B63H 21/17 |
| 2025/0012240 | A1 * | 1/2025 | D'Onofrio | F02M 21/0245 |
| 2025/0101934 | A1 * | 3/2025 | Kim | F02M 25/089 |
| 2025/0215836 | A1 * | 7/2025 | Suzuki | F02M 21/0206 |
| 2025/0243823 | A1 * | 7/2025 | Suzuki | F02D 41/3845 |
| 2025/0290463 | A1 * | 9/2025 | Tachibana | F02M 21/0239 |

FOREIGN PATENT DOCUMENTS

| | | | | | |
|---|---|---|---|---|---|
| EP | 2818674 | A1 | * | 12/2014 | F02D 41/0027 |
| EP | 3073104 | A1 | * | 9/2016 | B63H 21/38 |
| JP | 2019049261 | A | * | 3/2019 | F02D 19/0642 |
| KR | 102206923 | B1 | | 1/2021 | |
| KR | 20220053809 | A | * | 5/2022 | F02D 41/0032 |
| WO | WO-2015040267 | A1 | * | 3/2015 | F02M 21/0218 |
| WO | WO-2024046941 | A1 | * | 3/2024 | F02M 21/0206 |
| WO | WO-2024189325 | A1 | * | 9/2024 | F02M 21/0206 |
| WO | WO-2024245696 | A1 | * | 12/2024 | F02D 41/0027 |
| WO | WO-2025111393 | A1 | * | 5/2025 | F02N 11/0829 |

* cited by examiner

SYSTEMS AND METHODS FOR VENTING A PRESSURIZED FLUID USED AS A FUEL IN AN ENGINE

STATEMENT REGARDING FEDERALLY SPONSORED RESEARCH OR DEVELOPMENT

This invention was made with government support under contract DE-EE0009422 awarded by Department of Energy. The government has certain rights in the invention.

TECHNICAL FIELD

The present disclosure relates generally to systems and methods for purging pressurized fluids. More specifically, the present disclosure relates to the use of a ventilation valve that allows for the purging and ventilation of the high-pressure fluid through a ventilation stack in lieu of the exhaust system of an engine.

BACKGROUND

Machines in various uses are increasingly using alternative fuels such as hydrogen to power and drive the systems of the machines. For example, pressurized hydrogen can be used to power a fuel cell as well as act as fuel for a pressure, combustion engine. An advantage of using these types of fuels, such as hydrogen, is the benefit of an exhaust that is primarily, or exclusively, water vapor. However, the utilization of these types of fuels, such as hydrogen, often present a set of challenges. These alternate fuels are often pressurized, being provided from either pressurized fluid storage containers or another high-pressure source. Additionally, there may be issues with safety and equipment degradation if these high pressure, alternate fluids are left within parts of an engine while an engine is shutting down, shut down, or starting up.

Some efforts have been made to address the issue of pressurized fuels remaining in an engine after a shutdown. One approach for removing gaseous fuel from a fuel line is described in U.S. Patent Publication 2023/123561 to Fisher et. al (hereinafter referred to as "the '561 Publication"). The '561 application describes a multifuel capable engine system. The system of the '561 Publication describes the use of "a vent valve in a passage fluidically coupling the gaseous fuel supply line to atmosphere may be opened to purge the gaseous fuel to atmosphere." However, the system described in the '561 Publication describes venting only a portion of a fuel feed line, whereas other volumes of the fuel feed line may still have contained therein combustible, gaseous fuel. Further, the system described in the '561 Publication describes the introduction of fresh air to purge one or more portions of the fuel feed line, potentially increasing the risk of unwanted combustion.

Examples of the present disclosure are directed to overcoming deficiencies associated with known systems.

SUMMARY

In an aspect of the present disclosure, a method of venting a fuel feed line used to provide a gaseous fuel to an engine includes receiving, at an engine purge controller, a shutdown notice, issuing, by the engine purge controller, a fuel connection signal to cause a fuel shutoff valve to close, issuing, by the engine purge controller, a first gas shutoff valve signal to cause a first gas shutoff valve to close, and issuing, by the engine purge controller, a first vent valve signal to cause a fuel feed vent valve to open to vent a first portion of the gaseous fuel remaining in a first volume of the fuel feed line between the fuel shutoff valve and the first gas shutoff valve.

In another aspect of the present disclosure, an engine system includes an engine configured to combust a gaseous fuel, a fuel feed line used to provide the gaseous fuel the engine, a fuel shutoff valve configured to, when closed, isolate the gaseous fuel from the fuel feed line, a fuel feed vent valve configured to, when open, vent a first volume of the fuel feed line from a fuel source providing the gaseous fuel to the fuel shutoff valve, a first gas shutoff valve and a second gas shutoff valve downstream of the first gas shutoff valve, wherein the first gas shutoff valve or the second gas shutoff valve is configured to, when closed, isolate a first volume of the fuel feed line from the fuel shutoff valve to the first gas shutoff valve or the second gas shutoff valve, an isolation vent valve configured to, when open, vent a second volume of the fuel feed line from the second gas shutoff valve to a plurality of gas admission valves of the engine, and an engine purge controller comprising a memory storing computer-executable instructions, and a processor in communication with the memory, the computer-executable instructions causing the processor to perform acts comprising receiving, at the engine purge controller, a shutdown notice, issuing, by the engine purge controller, a fuel connection signal to cause the fuel shutoff valve to close, issuing, by the engine purge controller, a first gas shutoff valve signal to cause the first gas shutoff valve to close, issuing, by the engine purge controller, a second gas shutoff valve signal to cause the second gas shutoff valve to close, issuing, by the engine purge controller, a first vent valve signal to cause the fuel feed vent valve to open to vent the first volume, and issuing, by the engine purge controller, a second vent valve signal to cause the isolation vent valve to open to vent the second volume.

In a still further aspect of the present disclosure, a non-transitory computer-readable media storing computer-executable instructions that, when executed by one or more processors, cause the one or more processors to perform operations comprising receiving, at an engine purge controller, a shutdown notice to shut down an engine of an engine system, the engine system comprising an engine configured to combust a gaseous fuel, a fuel feed line used to provide the gaseous fuel the engine, a fuel shutoff valve configured to, when closed, isolate the gaseous fuel from the fuel feed line, a fuel feed vent valve configured to, when open, vent a first volume of the fuel feed line from a fuel source providing the gaseous fuel to the fuel shutoff valve, a first gas shutoff valve and a second gas shutoff valve downstream of the first gas shutoff valve, wherein the first gas shutoff valve or the second gas shutoff valve is configured to, when closed, isolate a first volume of the fuel feed line from the fuel shutoff valve to the first gas shutoff valve or the second gas shutoff valve, an isolation vent valve configured to, when open, vent a second volume of the fuel feed line from the second gas shutoff valve to a plurality of gas admission valves of the engine, issuing, by the engine purge controller, a fuel connection signal to cause the fuel shutoff valve to close, issuing, by the engine purge controller, a first gas shutoff valve signal to cause the first gas shutoff valve to close, issuing, by the engine purge controller, a second gas shutoff valve signal to cause the second gas shutoff valve to close, issuing, by the engine purge controller, a first vent valve signal to cause the fuel feed vent valve to open to vent the first volume, and issuing, by the engine purge controller, a second vent valve signal to cause the isolation vent valve to open to vent the second volume.

DETAILED DESCRIPTION

Figure 1:
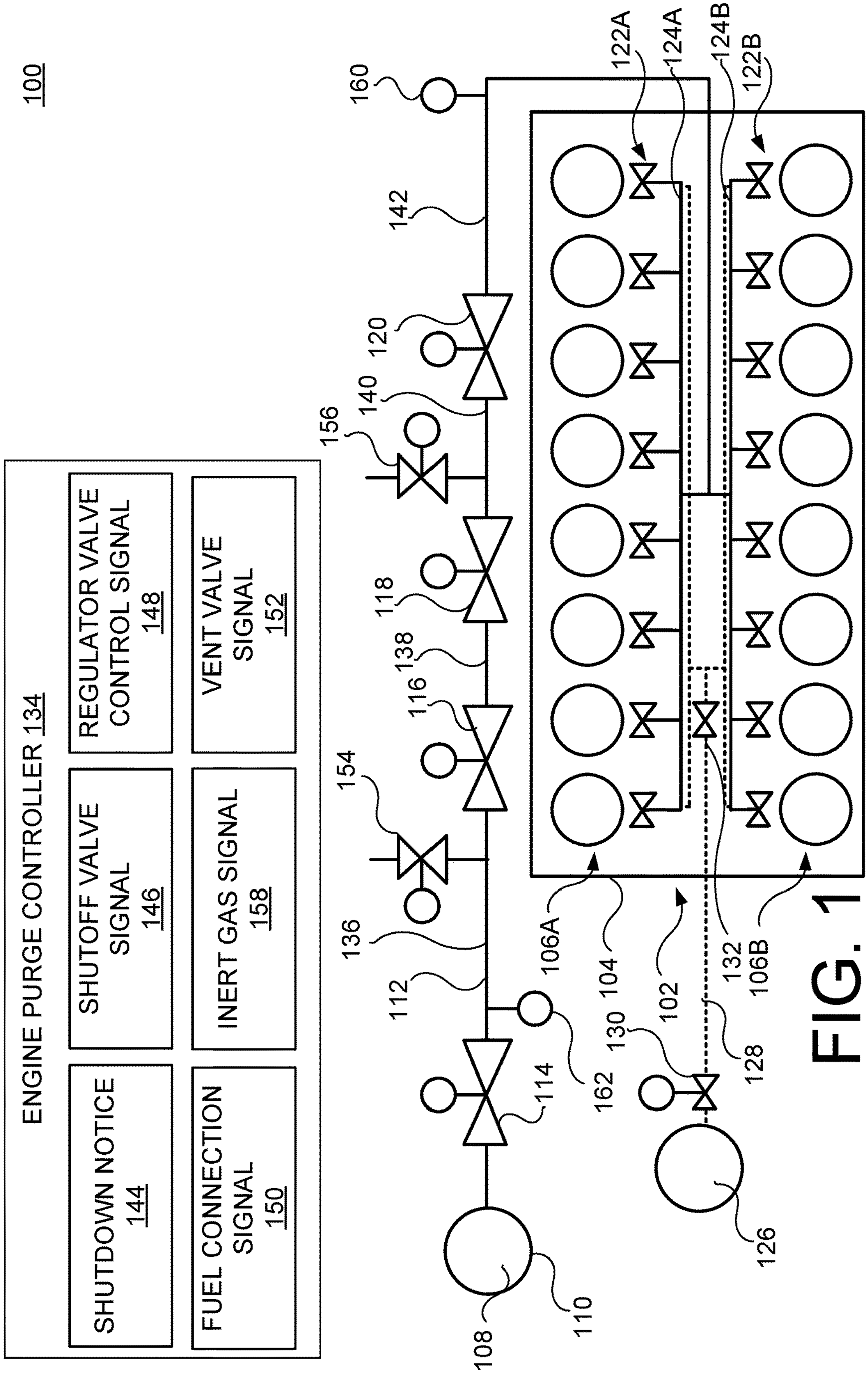
FIG. 1 an internal combustion engine system capable of venting a gaseous fuel such as hydrogen, in accordance with various embodiments of the presently disclosed subject matter.

Wherever possible, the same reference numbers will be used throughout the drawings to refer to same or like parts. FIG. 1 illustrates an engine system 100 capable of venting a gaseous fuel such as, but not limited to, hydrogen, in accordance with various embodiments of the presently disclosed subject matter. The engine system 100 includes an engine 102 having a cylinder block 104. A first set of combustion cylinders 106A and a second set of combustion cylinders 106B (hereinafter referred to individually as "a combustion cylinder 106," and collectively as "the combustion cylinders 106") are formed in the cylinder block 104. The combustion cylinders 106 can have any suitable arrangement such as a V-pattern, an inline pattern, or still others. The engine 102 may have any number of combustion cylinders 106. It will be understood that the combustion cylinders 106 are associated with a piston (not shown) movable between a top dead center position and a bottom dead center position in a generally conventional manner, typically in a four-stroke engine cycle, though other combustions cycles may be used and are considered to be within the scope of the presently disclosed subject matter. The pistons will be coupled with a crankshaft (not shown) rotatable to provide torque for purposes of vehicle propulsion, operating a generator for production of electrical energy, or in still other applications such as operating a compressor, a pump, or various other types of equipment.

The engine 102 is fueled by a fuel 108 provided by a fuel source 110. In some examples, the fuel 108 may be, but is not limited to a hydrocarbon-based fuel, a hydrogen-based fuel, hydrogen gas, natural gas, propane, other gaseous fluids, and various mixtures of the aforementioned fuels. For the purposes of FIG. 1, the fuel 108 is described as hydrogen, though as noted, other fuels may be used. In some examples, the fuel source 110 may be a production unit capable of producing the fuel. In other examples, the fuel source may be a storage tank having stored therein the fuel 108. In still further examples, the fuel source 110 may be a feed line to facility providing the fuel 108. The present disclosure is not limited to any type of the fuel source 110. The fuel 108 is provided to the engine 102 through a fuel feed line 112. A fuel shutoff valve 114 may be used to isolate the fuel source 110 from the fuel feed line 112 during various operations, including, but not limited to, a shutdown of the engine 102. In some examples, the fuel shutoff valve 114 is a manually operated valve. In other examples, the fuel shutoff valve 114 can be an electrically actuated, pneumatically actuated, or hydraulically actuated valve.

The cylinders 106 of the engine 102 are in fluidic communication with the fuel source 110 through the fuel shutoff valve 114, a first gas shutoff valve 116, a second gas shutoff valve 118 downstream of the first gas shutoff valve 116, and a regulator valve 120. As discussed below, in some examples, there may be one gas shutoff valve, two gas shutoff valves, or more than two gas shutoff valves. The present disclosure is not limited to any particular number of gas shutoff valves. The fuel 108 is introduced individually into each of the cylinders 106 through complimentary gas admission valves 122A and 122B, whereby each of the cylinders 106 has associated gas admission valves 122A and 122B that opens and closes to allow or abate the flow of the fuel 108 into a particular cylinder 106. The gas admission valves 122A receive the fuel 108 through a fuel rail 124A. In a similar manner, the gas admission valves 122B receive the fuel 108 through a fuel rail 124B. Also included in FIG. 1 is inert gas 126. The inert gas 126 is introduced into the cylinders 106 though an inert gas rail 128 when an inert gas shutoff valve 130 is open. The inert gas 126, when introduced into the cylinders 106, is used to evacuate the cylinders 106 of fuel 108 in the cylinders 106. A check valve 132 can be used to prevent the fuel 108 from entering the inert gas rail 128.

Various aspects of the engine system 100 can be controlled using an engine purge controller 134. The engine purge controller 134 can be a component of an engine control unit (ECU), an engine control module (ECM), or a separate control unit used to control various aspects of the engine system 100. The engine purge controller 134 includes one or more processors and memory storing therein instructions that, when executed by the processor of the engine purge controller 134, cause the engine purge controller 134 to control various components of the engine system 100. A task of the engine purge controller 134 is to manipulate various valves of the engine system 100 to purge the fuel 108 from various portions of the fuel feed line 112 to the fuel rail 124. For example, there may be an engine 102 condition (such as an emergency shutdown) in which the gas admission valves 122 are closed while the fuel 108 (which may be pressurized gas) is in the fuel rail 124. The fuel shutoff valve 114, along with the gas admission valves 122, may be closed to isolate the fuel 108 from the engine 102, preventing the further introduction of the fuel 108 into the cylinders 106. While in this configuration the fuel 108 may be isolated from the cylinders 106, there may remain a portion of the potentially pressurized and combustible fuel 108 in various volumes of the fuel feed line 112.

For example, if the fuel shutoff valve 114 and the gas admission valves 122, high pressure fuel 108 may remain in a fuel feed volume 136, a fuel feed volume 138, a fuel feed volume 140, and a fuel feed volume 142. The various volumes of the fuel feed may be isolated from each other using various valves. For example, upon receiving a shutdown notice 144, which may be received from an engine MCU or ECU, for example, the engine purge controller 134 may issue a shutoff valve signal 146 to the first gas shutoff valve 116 and the second gas shutoff valve 118 to cause the first gas shutoff valve 116 and the second gas shutoff valve 118 to close. In some examples, upon receiving the shutdown notice 144, which may be received from an engine MCU or ECU, the engine purge controller 134 may also issue a regulator valve control signal 148 to cause the regulator valve 120 to close. It should be noted that, in some examples, the closing of the regulator valve 120 may not fully isolate the fuel feed volume 140 from the fuel feed volume 142, as some regulator valves are not considered fully isolating valves. In still further examples, upon receiving the shutdown notice 144, which may be received from an engine MCU or ECU, the engine purge controller 134 may further issue a fuel connection signal 150 to close (or shut) the fuel shutoff valve 114. It should be noted, however, that as mentioned above, some or all of the valves described herein may be manual valves. In those examples, the "signal" may be an indication of the state of the valve (e.g., open, closed, or throttled). Further in some examples, some valves, such as the regulator valve 120, may be controlled by other controllers, and in the same manner described with regard to manually operated valves, the "signal" may be an indication of the state of the valve (e.g., open, closed, or throttled).

In the example described above whereby the engine purge controller 134 receives the shutdown notice 144 resulting in the closing of the fuel shutoff valve 114, the first gas shutoff valve 116, the second gas shutoff valve 118, and the regulator valve 120, pressurized fuel 108 may remain in the fuel feed volume 136, the fuel feed volume 138, the fuel feed volume 140, and the fuel feed volume 142. To vent the fuel 108 from the fuel feed volume 136, the fuel feed volume 138, the fuel feed volume 140, and the fuel feed volume 142, the engine purge controller 134 may issue a vent valve signal 152. To vent the fuel 108 in fuel feed volume 136, the vent valve signal 152 may be issued by the engine purge controller 134 to fuel feed vent valve 154. To vent the fuel 108 in the fuel feed volume 140, the vent valve signal 152 may be issued to the isolation vent valve 156. Fuel 108 in the fuel feed volume 142 may be pulled into the cylinders 106 as the engine 102 shuts down or may be vented through the isolation vent valve 156 if the regulator valve 120 is maintained open. In some examples, the engine purge controller 134 may further issue an inert gas signal 158 to open the gas shutoff valve 130, causing the pressure of the inert gas 126 to open the check valve 132, thereby purging the fuel rails 124 of remaining fuel 108 through the isolation vent valve 156.

In some examples, the timing of the closing of various valves by the engine purge controller 134 may be used to purge fuel feed volumes that do not have vent valves or, in some other examples, to provide various timing delays for various reasons such as, but not limited to, confirming the position of valves before other valves are manipulated. In the example described above where the fuel 108 may remain in isolated fuel volumes without a vent valve, the engine purge controller 134 can delay the closing to allow the fuel 108 to vent. For example, upon receiving the shutdown notice 144, the engine purge controller 134 can issue the shutoff valve signal 146 to the first gas shutoff valve 116 but not initially to the second gas shutoff valve 118. Closing the first gas shutoff valve 116 while keeping the second gas shutoff valve 118 open can allow the fuel 108 to be vented from the fuel feed volume 138 though the isolation vent valve 156 prior to the engine purge controller 134 causing the second gas shutoff valve 118 to close. In some examples, the delay may be based on a predetermined time, such as a five (5) second delay. In other examples, the delay may be based on a pressure detected in one or more of the volumes. For example, the engine purge controller 134 may use a pressure signal of a pressure detector 160 that indicates a pressure in the fuel feed volume 142. In this example, the engine purge controller 134 may first issue the shutoff valve signal 146 to cause the first gas shutoff valve 116 to close and the isolation vent valve 156 to open. Once the engine purge controller 134 receives a pressure signal from the pressure detector 160 that the pressure inside the fuel feed volume 142 is below a predetermined pressure (indicating a full or partial venting of the fuel 108 within the fuel feed volume 140 and the fuel feed volume 142, the engine purge controller 134 can issue the shutoff valve signal 146 to cause the second gas shutoff valve 118 to close.

In other examples, the engine purge controller 134 can use pressure detectors like the pressure detector 160 to provide an input as to when to open or close certain valves, as well as an input to determine if a valve is actually closed. For example, the engine purge controller 134 can monitor the pressure detected by the pressure detector 160 to determine, among other things, if one or more of the valves are not closed. In this example, the engine purge controller 134 may have issued the shutoff valve signal 146 to close the first gas shutoff valve 116 and close the second gas shutoff valve 118. In addition, the engine purge controller 134 may have issued the vent valve signal 152 to open the isolation vent valve 156. The engine purge controller 134 can then monitor the pressure indicated by the pressure detector 160. If the pressure detected by the pressure detector 160 does not go down to or approach atmospheric pressure (assuming the isolation vent valve 156 vents the fuel 108 to the atmosphere) within a predetermine time period, the engine purge controller 134 may determine either that the isolation vent valve 156 has not opened or the fuel 108 is still somehow entering the fuel feed volume 142. Thus, in this example, the engine purge controller 134 may reissue the aforementioned signals in an attempt to cause the valves to open or close as originally planned.

In another example, if the pressure detected by the pressure detector 160 does not go down to or approach atmospheric pressure within a predetermine time period, the engine purge controller 134 may use another pressure detector, such as a fuel pressure detector 162 to isolate the potential issue. In this example, if the pressure detected by the pressure detector 160 does not go down to or approach atmospheric pressure within a predetermine time period but the pressure detected by the fuel pressure detector 162 does go down or approach atmospheric pressure within a predetermined period of time (indicating that the fuel shutoff valve 114 is closed and the fuel feed vent valve 154 is open), the engine purge controller 134 may determine that the isolation vent valve 156 has not opened. The engine purge controller 134 may reissue the vent valve signal 152 in an attempt to open the isolation vent valve 156. In this same example, if the pressure detected by the pressure detector 160 does not go down to or approach atmospheric pressure within a predetermine time period and the pressure detected by the fuel pressure detector 162 does not go down or approach atmospheric pressure within a predetermined time period, the engine purge controller 134 may determine that one or more valves, such as the fuel shutoff valve 114 and the first/second gas shutoff valves 116/118 have not closed.

Figure 2:
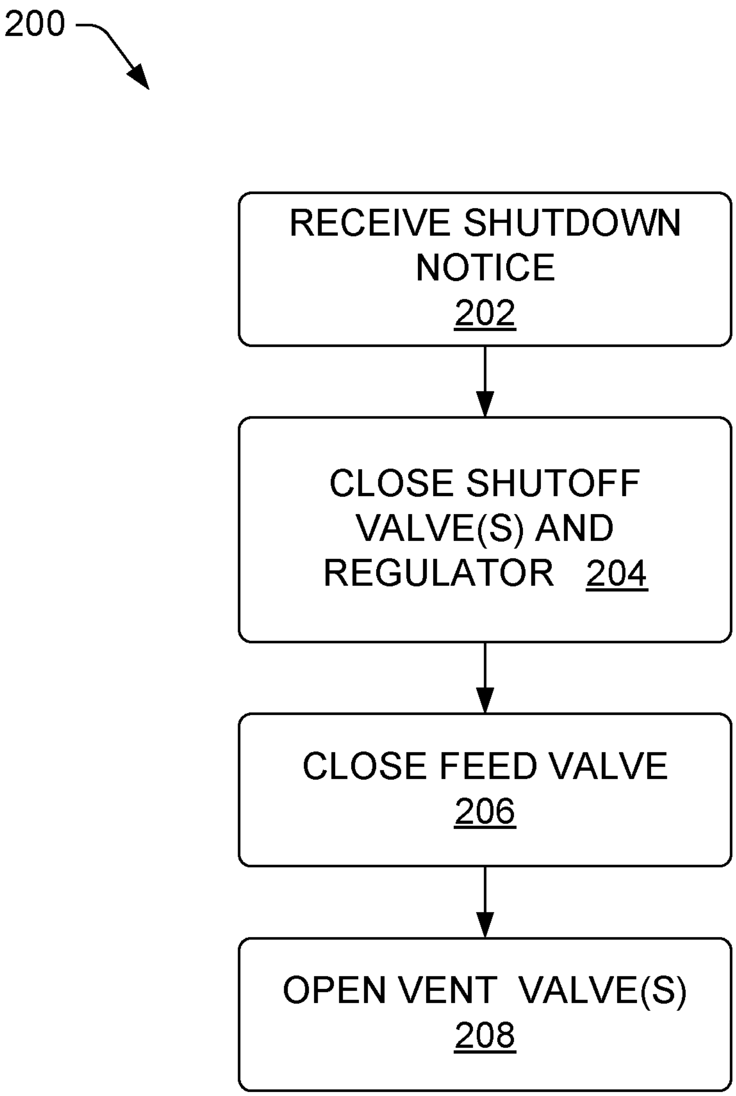
FIGS. 2 and 3 are flowcharts depicting methods of venting used by an engine purge controller, in accordance with various embodiments of the presently disclosed subject matter.
Figure 3:
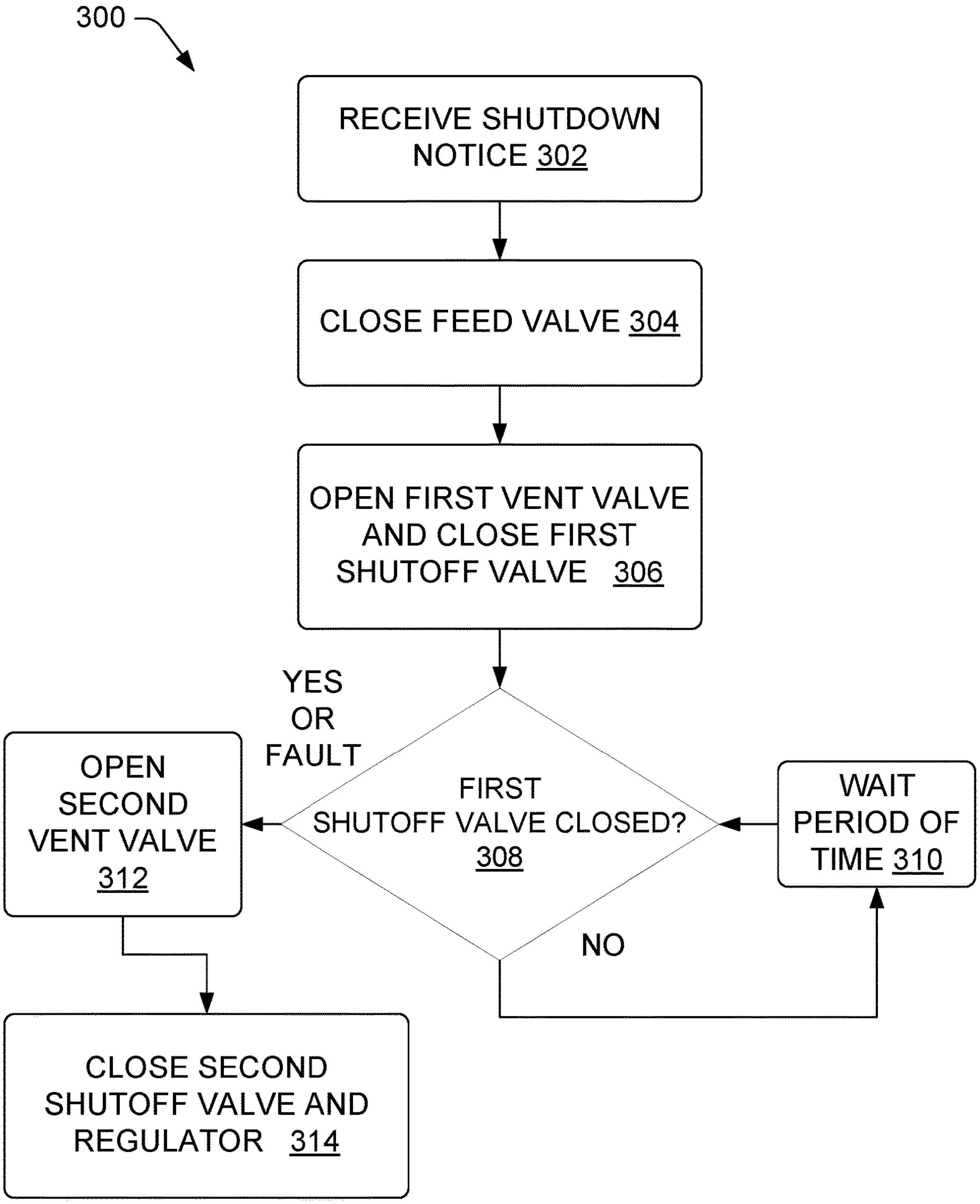

In some examples, the engine purge controller 134 may utilize a vent valve to reduce the effects of pressure transients within the engine system 100, including the fuel feed volume 142. Pressure transients may be experienced when the engine 102 experiences a relatively large, relatively sudden reduction in the amount of the fuel 108 required (such as a reduction in required power from a relatively higher power level to a relatively lower power level). In these instances, there may be a disparity between the amount of the fuel 108 being allowed in the fuel feel volume 142 through the regulator valve 120 (relatively higher flow rate) and the amount of the fuel 108 being used by the engine 102 (relatively lower flow rate). In this configuration, the engine purge controller 134 may receive a pressure signal from the pressure detector 160 indicating a transient increase in pressure above a predetermined setpoint. For example, if the engine 102 power level is reduced relatively quickly from 100% power to idle (or about 2% power), the transient pressure detected by the pressure detector 160 may indicate an increase in pressure of 5 psi. If the increase (or change) in pressure is above a predetermined rate of change (e.g., psi/second) or a predetermined amount (e.g., above 5 psi from a standard operating pressure), the engine purge controller 134 may issue the vent valve signal 152 to open the isolation vent valve 156 to at least partially vent the fuel feed volume 142 to reduce the pressure transient. Once the pressure detected by the pressure detector 160 goes below either a predetermined rate of change or a predetermined amount, the engine purge controller 134 may issue the vent valve signal 152 to close the isolation vent valve 156. It should be understood that the use of the isolation vent valve 156 is just by way of example, as other vent valves, including the fuel feed vent valve 154 may be used and are considered to be within the scope of the present disclosure. The engine purge controller 134 may reissue the vent valve signal 152 as well as the shutoff valve signal 146 in an attempt to configure the engine system 100 for venting. FIGS. 2 and 3 describe functional aspects of the engine purge controller 134.

FIG. 2 is a flowchart depicting a method 200 of venting the fuel 108 from the engine system 100, in accordance with various examples described herein. The method 200 and the method 300, below, are illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For disclosure purposes, the method 200 and the method 300 may be described with reference to the engine purge controller 134 used in the engine system 100 of FIG. 1, however other environments may also be used.

At step 202, the engine purge controller 134 receives the shutdown notice 144. As noted above, the shutdown notice 144 may be received from various sources such as the ECU/ECM of the engine system 100. The shutdown notice 144 may be provided in response to an instruction or control input by an operator of a work machine or vehicle (not shown) in which the engine system 100 is used. In other examples, the shutdown notice 144 may be received in response to an emergency or fault condition in which the engine system 100 shuts down the engine 102 in an expeditious or emergency manner. The presently disclosed subject matter is not limited to any reason or source of the shutdown notice 144.

At step 204, the engine purge controller 134 issues the shutoff valve signal 146 to close the first gas shutoff valve 116 and the second gas shutoff valve 118, and to open the isolation vent valve 156. In some examples, the gas admission valves 122 may remain open to combust remaining fuel 108. In further examples, the engine purge controller 134 may further issue the regulator valve control signal 148 to close the regulator valve 120.

At step 206, either before, after, or in conjunction with step 204, the engine purge controller 134 may issue the fuel connection signal 150 to close the fuel shutoff valve 114. As noted above, in some examples, the fuel shutoff valve 114 may be operated by the fuel connection signal 150, and in other examples, may be a manually operated valve. In the examples in which the fuel shutoff valve 114 is a manually operated valve, the fuel connection signal 150 may be an indication transmitted to the engine purge controller 134 that the fuel shutoff valve 114 is closed.

At step 208, either before, after, or in conjunction with steps 202 and step 204, the engine purge controller 134 may issue the vent valve signal 152 to open the fuel feed vent valve 154 and the isolation vent valve 156. As noted above, rather than closing isolation valves and opening vent valves upon receiving the shutdown notice 144, the engine purge controller 134 may close and open valves based on conditions determined within the engine system 100, an example of which is described in FIG. 3.

FIG. 3 illustrates a method 300 in which the engine purge controller 134 delays the opening of the isolation vent valve 156 and the closing of the second gas shutoff valve 118 and the regulator valve 120 to vent the fuel 108 from the fuel feed volume 138 prior to isolating the fuel feed volume 138 by the closing of both the shutoff valves.

At step 302, the engine purge controller 134 receives the shutdown notice 144. As noted above, the shutdown notice 144 may be received from various sources such as the ECU/ECM of the engine system 100. The shutdown notice 144 may be provided in response to an instruction or control input by an operator of a work machine or vehicle (not shown) in which the engine system 100 is used. In other examples, the shutdown notice 144 may be received in response to an emergency or fault condition in which the engine system 100 shuts down the engine 102 in an expeditious or emergency manner. The presently disclosed subject matter is not limited to any reason or source of the shutdown notice 144.

At step 304, the engine purge controller 134 issues the fuel connection signal 150 to close the fuel shutoff valve 114. As noted above, in some examples, the fuel shutoff valve 114 may be operated by the fuel connection signal 150, and in other examples, may be a manually operated valve. In the examples in which the fuel shutoff valve 114 is a manually operated valve, the fuel connection signal 150 may be an indication transmitted to the engine purge controller 134 that the fuel shutoff valve 114 is closed.

At step 306, either before, after, or in conjunction with step 304, the engine purge controller 134 issues the shutoff valve signal 146 to close the first gas shutoff valve 116 and the vent valve signal 152 to open the fuel feed vent valve 154.

At step 308, the engine purge controller 134 determines if the first gas shutoff valve 116 is closed. The engine purge controller 134 may use a valve position sensor on the first gas shutoff valve to determine if the first gas shutoff valve 116 is closed. If the engine purge controller 134 determines that the first gas shutoff valve 116 is closed, at step 310, the engine purge controller 134 may wait a period of time and continually recheck the position of the first gas shutoff valve and reperform the step 308.

If at step 308 the engine purge controller 134 determines that the first gas shutoff valve 116 is closed, at step 312, the engine purge controller 134 issues the vent valve signal 152 to open the isolation vent valve 156. Before, during, or after the step 312, at step 314, the engine purge controller 134 also issues the shutoff valve signal 146 to close the second gas shutoff valve 118.

As mentioned above, the engine purge controller 134, at step 310, will wait a period of time and recheck the status of the first gas shutoff valve 116. However, after a predetermined period of time, the engine purge controller 134 may determine that a fault exists whereby either the first gas shutoff valve 116 is not closing or the indication of the position of the first gas shutoff valve 116 is not changing from an open position to a closed position. In either condition, the engine purge controller 134, after the predetermined period of time, may determine that a fault condition exists and move forward onto the step 312 to continue the venting process. The engine purge controller 134, after determining that a fault condition exists, can reissue the shutoff valve signal to close the first gas shutoff valve 116 and a second gas shutoff valve signal to close the second gas shutoff valve 118.

Figure 4:
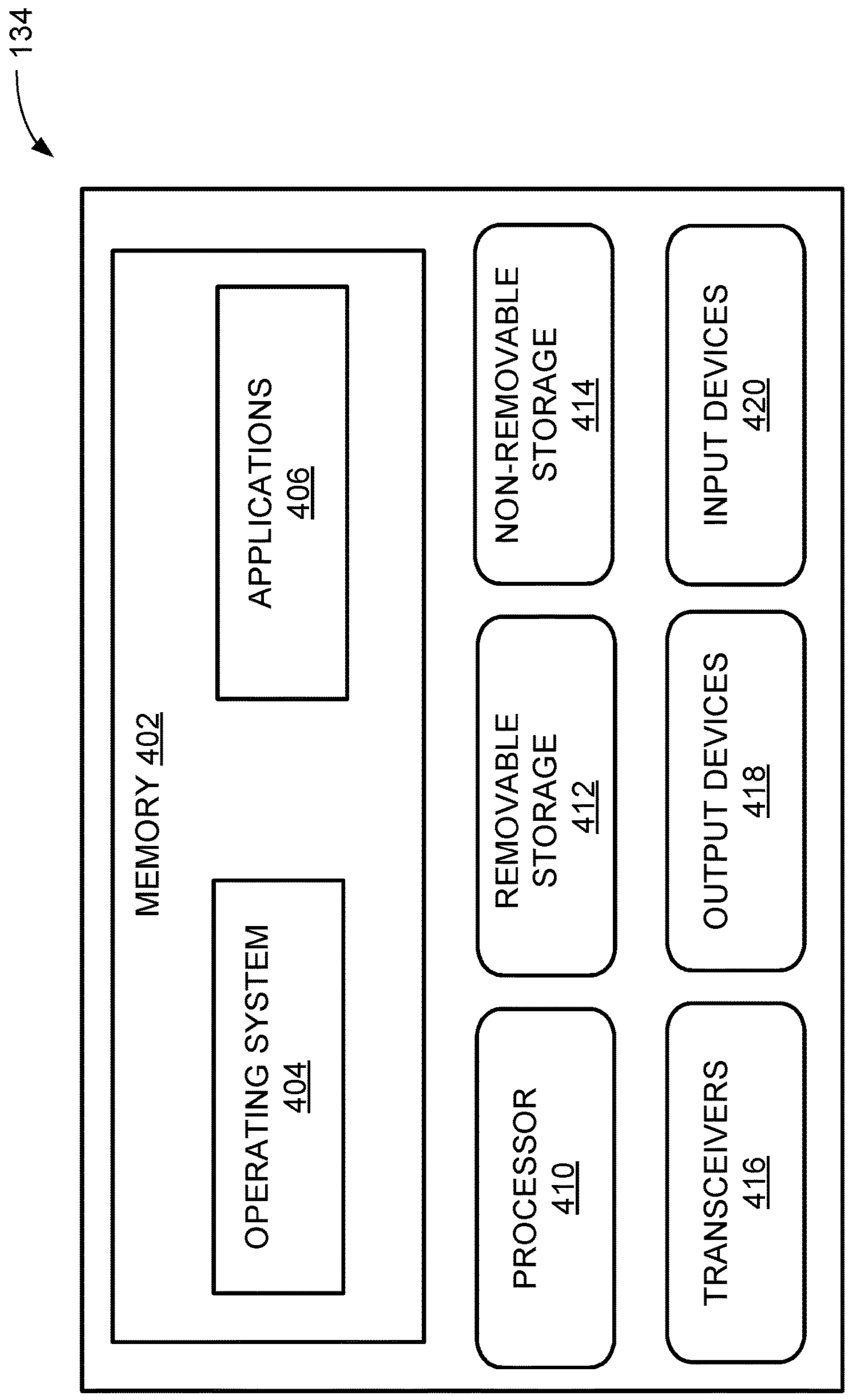
FIG. 4 is a schematic illustrating components of an engine purge controller, in accordance with various embodiments of the presently disclosed subject matter.

FIG. 4 depicts a component level view of the engine purge controller 134 for use with the systems and methods described herein, in accordance with various examples of the present disclosure. The engine purge controller 134 could be any device capable of providing the functionality associated with the systems and methods described herein. The engine purge controller 134 can comprise several components to execute the above-mentioned functions. The engine purge controller 134 may be comprised of hardware, software, or various combinations thereof. As disclosed below, the engine purge controller 134 can comprise memory 402 including an operating system (OS) 404 and one or more standard applications 406. The standard applications 406 may include applications that generate the shutoff valve signal 146, the regulator valve control signal 148, the fuel connection signal 150, the inert gas signal 158 and the vent valve signal 152, for example.

The engine purge controller 134 can also comprise one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two.

The memory 402 can also include the OS 404. The OS 404 varies depending on the manufacturer of the engine purge controller 134. The OS 404 contains the modules and software that support basic functions of the engine purge controller 134, such as scheduling tasks, executing applications, and controlling peripherals. The OS 404 can also enable the engine purge controller 134 to send and retrieve other data and perform other functions, such as determine positions of valves as well as issue the shutoff valve signal 146, the regulator valve control signal 148, the fuel connection signal 150, the inert gas signal 158 and the vent valve signal 152.

The engine purge controller 134 can also comprise one or more processors 410. In some implementations, the processor(s) 410 can be one or more central processing units (CPUs), graphics processing units (GPUs), both CPU and GPU, or any other combinations and numbers of processing units. The engine purge controller 134 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the engine purge controller 134. Any such non-transitory computer-readable media may be part of the engine purge controller 134 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the engine purge controller 134 and one or more valves of the engine system 100), the Internet, and/or an intranet. Specifically, the transceiver(s) 416 can include one or more transceivers that can enable the engine purge controller 134 to send the shutoff valve signal 146, the regulator valve control signal 148, the fuel connection signal 150, the inert gas signal 158 and the vent valve signal 152. The transceiver(s) 416 can enable the engine purge controller 134 to connect to multiple networks including, but not limited to 2G, 3G, 4G, 5G, and Wi-Fi networks. The transceiver(s) 416 can also include one or more transceivers to enable the engine purge controller 134 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver (s) 416 can enable the engine purge controller 134 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

Those of ordinary skill in the field will also appreciate that the principles of this disclosure are not limited to the specific examples disclosed or illustrated in the figures.

INDUSTRIAL APPLICABILITY

The present disclosure uses vent valves to remove combustible, gaseous fuel such as pressurized hydrogen from various volumes (or portions) of a fuel feed line 112 of an engine 102. An engine purge controller 134 is used to manipulate shutoff valves and vent valves of the engine system 100 to vent the fuel 108 from the fuel feed line 112. The engine purge controller 134 uses the vent valves in conjunction with an inert gas 126 introduced through an inert gas rail 128 to push the fuel 108 out through the one or more vent valves (154, 156). In some examples, the ability to use multiple vent valves in conjunction with multiple shutoff valves can help remove the fuel 108 from the engine 102 fuel feed line 112. For example, in an emergency situation, the engine 102 may immediately shutdown, whereby gas admission valves 122 that allow the flow of the fuel 108 into individual cylinders 106 may close, preventing the removal of the fuel 108 through the cylinders 106. The engine system 100 uses the first gas shutoff valve 116, the second gas shutoff valve 118, and the fuel shutoff valve 114 to isolate the engine 102 from the fuel 108. The engine system 100 thereafter uses the fuel feed vent valve 154 to vent fuel 108 remaining between the fuel shutoff valve 114 and the first gas shutoff valve 116. The engine system 100 also uses the isolation vent valve 156 to vent fuel 108 remaining in the volume between the second gas shutoff valve 118 and the fuel rail 124. Further, the engine system 100 can also delay the closing of the second gas shutoff valve 118 from the closing of the first gas shutoff valve 116 to allow the venting of fuel 108 remaining in the volume between the first gas shutoff valve 116 and the second gas shutoff valve 118. Thus, fuel 108 remaining in various volumes of the fuel feed line 112 can be individually vented. The engine purge controller 134 may also use vent valves, such as the isolation vent valve 156, to reduce the effects of pressure transients in the fuel feed volume 142 caused by relatively large reductions in engine 102 power.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method of venting a fuel feed line used to provide a gaseous fuel to an engine, the method comprising:

receiving, at an engine purge controller, a shutdown notice;

issuing, by the engine purge controller, a fuel connection signal to cause a fuel shutoff valve to close;

issuing, by the engine purge controller, a first gas shutoff valve signal to cause a first gas shutoff valve to close;

issuing, by the engine purge controller, a first vent valve signal to cause a fuel feed vent valve to open to vent a first portion of the gaseous fuel remaining in a first volume of the fuel feed line between the fuel shutoff valve and the first gas shutoff valve;

issuing, by the engine purge controller, a second gas shutoff valve signal to cause a second gas shutoff valve to close, wherein issuing, by the engine purge controller, the second gas shutoff valve signal to cause the second gas shutoff valve to close comprises:

waiting a predetermined period of time after issuing the first gas shutoff valve signal;

issuing the second gas shutoff valve signal after the predetermined period of time; and issuing, by the engine purge controller, a second vent valve signal to cause an isolation vent valve to open to vent a portion of the gaseous fuel remaining in a second volume of the fuel feed line between the second gas shutoff valve and the engine.

2. The method of claim 1, wherein issuing, by the engine purge controller, the second gas shutoff valve signal to cause the second gas shutoff valve to close further comprises:

determining, by the engine purge controller, if the first gas shutoff valve is closed;

if the engine purge controller determines the first gas shutoff valve is closed, issuing the second gas shutoff valve signal; and if the engine purge controller determines the first gas shutoff valve is not closed, determining that a fault condition exists and:

reissuing the first gas shutoff valve signal; and issuing the second gas shutoff valve signal.

3. The method of claim 1, wherein issuing, by the engine purge controller, the second gas shutoff valve signal to cause the second gas shutoff valve to close comprises:

receiving, by the engine purge controller, a pressure signal from a pressure detector indicating that a pressure in a volume of the fuel feed line is below a predetermined pressure; and issuing the second gas shutoff valve signal.

4. The method of claim 1, further comprising issuing, by the engine purge controller, an inert gas signal to open an inert gas shutoff valve to introduce an inert gas into the fuel feed line to purge the gaseous fuel from the engine.

5. The method of claim 1, further comprising issuing, by the engine purge controller, a regulator valve control signal to close a regulator valve.

6. The method of claim 1, wherein the gaseous fuel comprises a hydrocarbon-based fuel, a hydrogen-based fuel, hydrogen, natural gas, or a mixture comprising two or more of the hydrocarbon-based fuel, the hydrogen-based fuel, the hydrogen, or the natural gas.

7. An engine system, comprising:

an engine configured to combust a gaseous fuel;

a fuel feed line used to provide the gaseous fuel to the engine;

a fuel shutoff valve configured to, when closed, isolate the gaseous fuel from the fuel feed line;

a fuel feed vent valve configured to, when open, vent a first volume of the fuel feed line from the fuel shutoff valve to the fuel feed vent valve;

a first gas shutoff valve and a second gas shutoff valve downstream of the first gas shutoff valve, wherein the first gas shutoff valve or the second gas shutoff valve is configured to, when closed, isolate the first volume of the fuel feed line from the fuel shutoff valve to the first gas shutoff valve or the second gas shutoff valve;

an isolation vent valve configured to, when open, vent a second volume of the fuel feed line from the second gas shutoff valve to a plurality of gas admission valves of the engine; and an engine purge controller comprising:

a memory storing computer-executable instructions; and a processor in communication with the memory, the computer-executable instructions causing the processor to perform acts comprising:

receiving, at the engine purge controller, a shutdown notice;

issuing, by the engine purge controller, a fuel connection signal to cause the fuel shutoff valve to close;

issuing, by the engine purge controller, a first gas shutoff valve signal to cause the first gas shutoff valve to close;

issuing, by the engine purge controller, a second gas shutoff valve signal to cause the second gas shutoff valve to close;

issuing, by the engine purge controller, a first vent valve signal to cause the fuel feed vent valve to open to vent the first volume of the fuel feed line; and issuing, by the engine purge controller, a second vent valve signal to cause the isolation vent valve to open to vent the second volume;

waiting a predetermined period of time after issuing the first gas shutoff valve signal; and issuing the second gas shutoff valve signal after the predetermined period of time.

8. The engine system of claim 7, further comprising computer-executable instructions causing the processor to perform acts comprising:

waiting a predetermined period of time after issuing the first gas shutoff valve signal; and determining, by the engine purge controller, if the first gas shutoff valve is closed;

if the engine purge controller determines the first gas shutoff valve is closed, issuing the second gas shutoff valve signal; and if the engine purge controller determines the first gas shutoff valve is not closed, determining that a fault condition exists and:

reissuing the first gas shutoff valve signal; and issuing the second gas shutoff valve signal.

9. The engine system of claim 7, further comprising computer-executable instructions causing the processor to perform acts comprising:

receiving, by the engine purge controller, a pressure signal from a pressure detector indicating that a pressure in a volume of the fuel feed line is below a predetermined pressure; and issuing the second gas shutoff valve signal.

10. The engine system of claim 7, further comprising computer-executable instructions causing the processor to perform acts comprising issuing, by the engine purge controller, an inert gas signal to open an inert gas shutoff valve to introduce an inert gas into the fuel feed line to purge the gaseous fuel from the engine.

11. The engine system of claim 7, further comprising computer-executable instructions causing the processor to perform acts comprising issuing, by the engine purge controller, a regulator valve control signal to close a regulator valve.

12. A non-transitory computer-readable media storing computer-executable instructions that, when executed by one or more processors, cause the one or more processors to perform operations comprising:

receiving, at an engine purge controller, a shutdown notice to shut down an engine of an engine system, the engine system comprising:

the engine configured to combust a gaseous fuel;

a fuel feed line used to provide the gaseous fuel to the engine;

a fuel shutoff valve configured to, when closed, isolate the gaseous fuel from the fuel feed line;

a fuel feed vent valve configured to, when open, vent a first volume of the fuel feed line from the fuel shutoff valve to the fuel feed vent valve;

a first gas shutoff valve and a second gas shutoff valve downstream of the first gas shutoff valve, wherein the first gas shutoff valve or the second gas shutoff valve is configured to, when closed, isolate the first volume of the fuel feed line from the fuel shutoff valve to the first gas shutoff valve or the second gas shutoff valve; and an isolation vent valve configured to, when open, vent a second volume of the fuel feed line from the second gas shutoff valve to a plurality of gas admission valves of the engine;

issuing, by the engine purge controller, a fuel connection signal to cause the fuel shutoff valve to close;

issuing, by the engine purge controller, a first gas shutoff valve signal to cause the first gas shutoff valve to close;

issuing, by the engine purge controller, a second gas shutoff valve signal to cause the second gas shutoff valve to close;

issuing, by the engine purge controller, a first vent valve signal to cause the fuel feed vent valve to open to vent the first volume of the fuel feed line;

issuing, by the engine purge controller, a second vent valve signal to cause the isolation vent valve to open to vent the second volume;

receiving, by the engine purge controller, a pressure signal from a pressure detector indicating that a pressure in a volume of the fuel feed line is below a predetermined pressure; and issuing the second gas shutoff valve signal.

13. The non-transitory computer-readable media of claim 12, wherein the computer-executable instructions further comprise instructions that, when executed by one or more processors, cause the one or more processors to perform operations comprising:

waiting a predetermined period of time after issuing the first gas shutoff valve signal; and issuing the second gas shutoff valve signal after the predetermined period of time.

14. The non-transitory computer-readable media of claim 12, wherein the computer-executable instructions further comprise instructions that, when executed by one or more processors, cause the one or more processors to perform operations comprising:

waiting a predetermined period of time after issuing the first gas shutoff valve signal;

determining, by the engine purge controller, if the first gas shutoff valve is closed; and if the engine purge controller determines the first gas shutoff valve is closed, issuing the second gas shutoff valve signal; and if the engine purge controller determines the first gas shutoff valve is not closed, determining that a fault condition exists and:

reissuing the first gas shutoff valve signal; and issuing the second gas shutoff valve signal.

15. The non-transitory computer-readable media of claim 12, wherein the computer-executable instructions further comprise instructions that, when executed by one or more processors, cause the one or more processors to perform operations comprising issuing, by the engine purge controller, an inert gas signal to open an inert gas shutoff valve to introduce an inert gas into the fuel feed line to purge the gaseous fuel from the engine.

16. The non-transitory computer-readable media of claim 12, wherein the computer-executable instructions further comprise instructions that, when executed by one or more processors, cause the one or more processors to perform operations comprising issuing, by the engine purge controller, a regulator valve control signal to close a regulator valve.

* * * * *